(12) United States Patent
Ferdi et al.

(10) Patent No.: US 12,356,180 B2
(45) Date of Patent: Jul. 8, 2025

(54) METHODS, APPARATUS, AND SYSTEMS FOR COMMUNICATIONS SECURITY WITH PROXIMITY SERVICES RELAY WTRU

(71) Applicant: InterDigital Patent Holdings, Inc., Wilmington, DE (US)

(72) Inventors: Samir Ferdi, Kirkland (CA); Alec Brusilovsky, Downingtown, PA (US); Michelle Perras, Montreal (CA); Xiaoyan Shi, Lake Oswego, OR (US); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 186 days.

(21) Appl. No.: 18/033,117

(22) PCT Filed: Oct. 28, 2021

(86) PCT No.: PCT/US2021/057000
§ 371 (c)(1),
(2) Date: Apr. 21, 2023

(87) PCT Pub. No.: WO2022/094042
PCT Pub. Date: May 5, 2022

(65) Prior Publication Data
US 2023/0388785 A1 Nov. 30, 2023

Related U.S. Application Data

(60) Provisional application No. 63/107,024, filed on Oct. 29, 2020.

(51) Int. Cl.
*H04W 12/033* (2021.01)
*H04L 9/40* (2022.01)
*H04W 12/041* (2021.01)

(52) U.S. Cl.
CPC .......... *H04W 12/033* (2021.01); *H04L 63/20* (2013.01); *H04W 12/041* (2021.01)

(58) Field of Classification Search
CPC ............. H04W 12/033; H04W 12/041; H04W 12/106; H04W 88/04; H04L 63/20; G06F 21/64
See application file for complete search history.

(56) References Cited

U.S. PATENT DOCUMENTS

| | | | |
|---|---|---|---|
| 2013/0287012 A1 * | 10/2013 | Pragada | H04W 76/14 370/338 |
| 2020/0037165 A1 * | 1/2020 | Kunz | H04W 12/106 |

(Continued)

FOREIGN PATENT DOCUMENTS

| | | | | |
|---|---|---|---|---|
| GB | 2581392 A | * | 8/2020 | H04W 12/10 |
| WO | WO-2019193147 A1 | * | 10/2019 | H04L 63/123 |
| WO | WO-2020260921 A2 | * | 12/2020 | H04W 12/0013 |

OTHER PUBLICATIONS

3GPP TR 23.752 V0.5.1, "Study on system enhancement for Proximity based Services (ProSe) in the 5G System", (5GS), Oct. 2020, 162 pages.
3GPP TS 23.287 V16.4.0, "Architecture enhancements for 5G System (5GS) to support Vehicle-to-Everything (V2X) services", Sep. 2020, 58 pages.

(Continued)

*Primary Examiner* — John B King
(74) *Attorney, Agent, or Firm* — Flaster Greenberg P.C.

(57) ABSTRACT

Methods, apparatus, and systems for a wireless transmit receive unit (WTRU) performing relay communications are provided. A method may include receiving a first message indicating: (1) a first security policy associated with a first data link, and (2) a maximum data rate for integrity protection (MDRIP) supported by the remote WTRU; transmitting, to a network, a second message indicating: (1) an (Continued)

MDRIP supported by the remote WTRU or by the relay WTRU, and (2) a request for PDU session establishment; receiving, from the network, a third message indicating a second security policy for a second data link; and establishing the first data link with the remote WTRU on the condition that an end-to-end (e2e) security policy is compatible with the second security policy, wherein the e2e security policy is determined according to the second security policy and a UP security policy of the relay WTRU.

18 Claims, 6 Drawing Sheets

(56) References Cited

U.S. PATENT DOCUMENTS

| | | | |
|---|---|---|---|
| 2020/0236544 A1* | 7/2020 | Kunz | H04W 4/70 |
| 2022/0132316 A1* | 4/2022 | De Kievit | H04W 12/041 |
| 2022/0132375 A1* | 4/2022 | Khirallah | H04W 12/106 |
| 2022/0225448 A1* | 7/2022 | Li | H04W 60/04 |
| 2022/0353687 A1* | 11/2022 | Darshini | H04W 76/14 |
| 2023/0090543 A1* | 3/2023 | Wu | H04W 12/033 |
| | | | 455/410 |
| 2023/0239264 A1* | 7/2023 | Wang | G06F 16/27 |
| | | | 709/206 |

OTHER PUBLICATIONS

3GPP TS 23.501 V16.6.0 , "System Architecture for the 5G System", Sep. 2020, 447 pages.
3GPP TS 23.502 V16.6.0 , "Procedures for the 5G System", Sep. 2020.
3GPP TS 33.501 V16.4.0 , "Security architecture and procedures for 5G system", Sep. 2020, 250 pages.
3GPP TS 33.536 V16.1.0 , "Security aspects of 3GPP support for advanced Vehicle-to-Everything (V2X) services", Sep. 2020, 23 pages.
S3-202379 , "TR 33.847—New key issue on security protection misalignment in L3 UE2NW relay", Oct. 12-16, 2020, 2 pages.
S3-202613 , "New KI for security policy handling in ProSe relay communication", Oct. 12-16, 2020, 2 pages.
SA3 TR 33.847 V0.2.0 , "Study on Security Aspects of Enhancement for Proximity Based Services in 5GS", Oct. 2020, 45 pages.
S3-181309, "UP security policy", Ericsson, 3GPP TSG-SA WG3 Meeting #91, Apr. 2018, 3 pages.
S3-202380, Solution for Handling Security Policy Misalignment Over ProSe L3 UE2NW Relay, LG Electronics, 3GPP TSG-SA3 Meeting #101e, Oct. 2020, 3 pages.
S3-202614, "Solution for Security Policies Handling in Relay Communication", Samsung, 3GPP TSG-SA3 Meeting #100bis-e, Oct. 2020, 2 pages.

\* cited by examiner

METHODS, APPARATUS, AND SYSTEMS FOR COMMUNICATIONS SECURITY WITH PROXIMITY SERVICES RELAY WTRU

CROSS-REFERENCE TO RELATED APPLICATIONS

This application is the 371 National Stage of International Application No. PCT/US2021/057000, filed Oct. 28, 2021, which claims the benefit of U.S. Provisional Application No. 63/107,024, filed Oct. 29, 2020, the entire contents of which are incorporated herein by reference.

BACKGROUND

The present invention relates to the field of computing and communications and, more particularly, to methods, apparatus, systems, architectures and interfaces for computing and communications in an advanced or next generation wireless communication system, including communications carried out using a new radio and/or new radio (NR) access technology and communication systems. Such NR access and technology, which may also be referred to as 5G, and/or other similar wireless communication systems and technology may include features and/or technologies for any of User plane and/or V2X security and/or security policy, and network relay.

BRIEF DESCRIPTION OF THE DRAWINGS

A more detailed understanding may be had from the following description, given by way of example in conjunction with the accompanying drawings, wherein like reference numerals in the figures indicate like elements, and wherein.

EXAMPLE NETWORKS FOR IMPLEMENTATION OF THE EMBODIMENTS

Figure 1A:
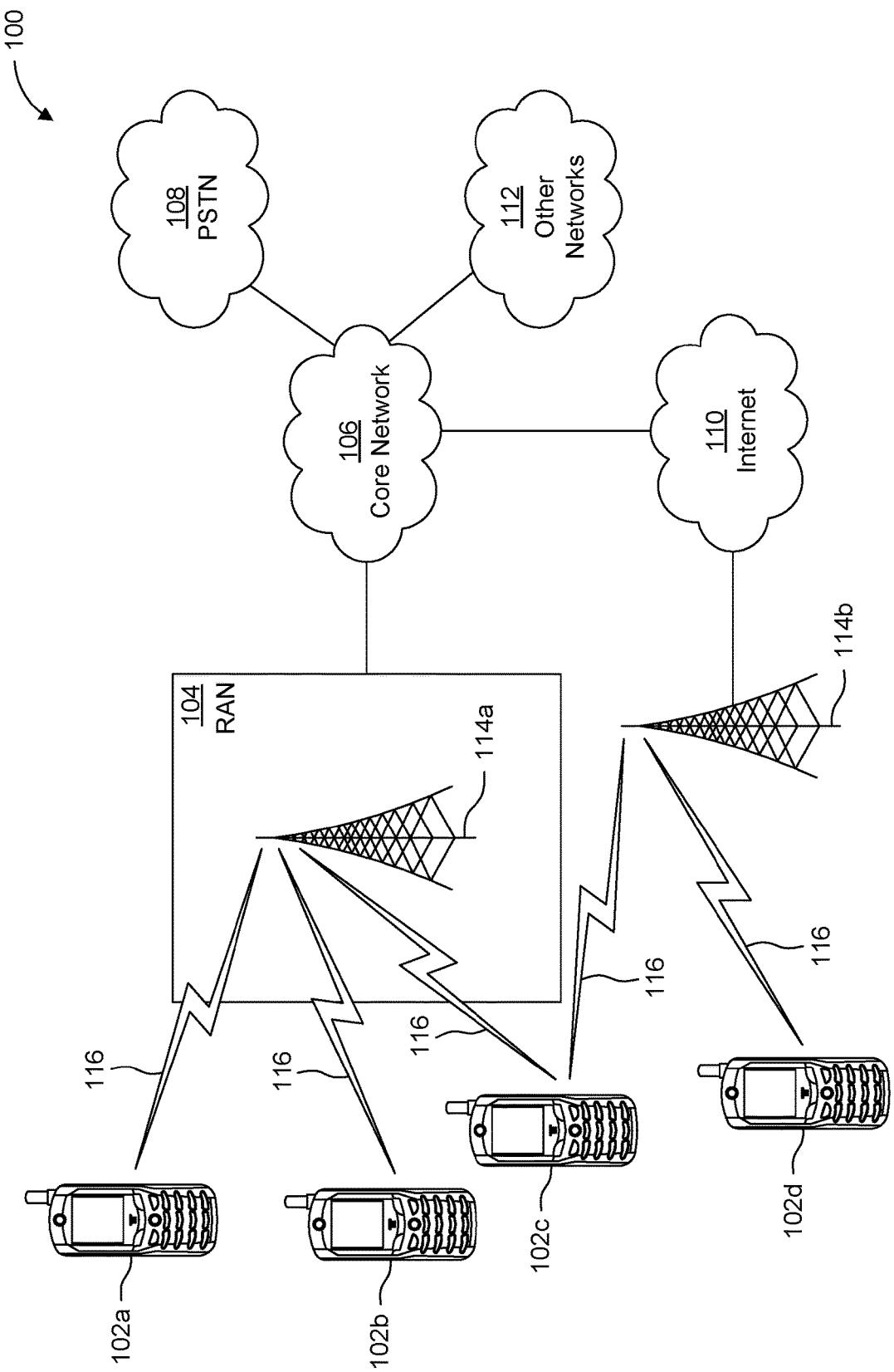
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
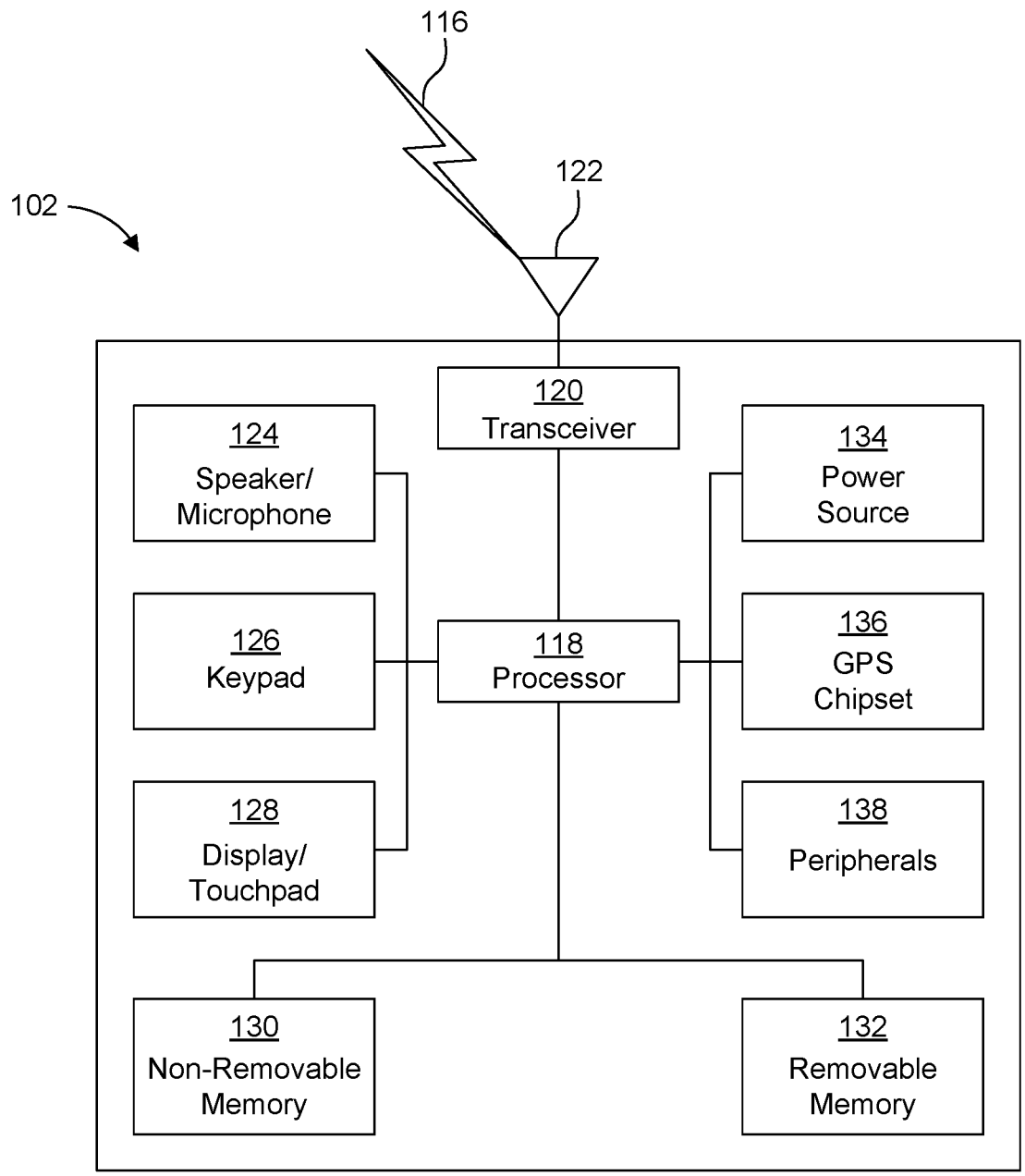
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
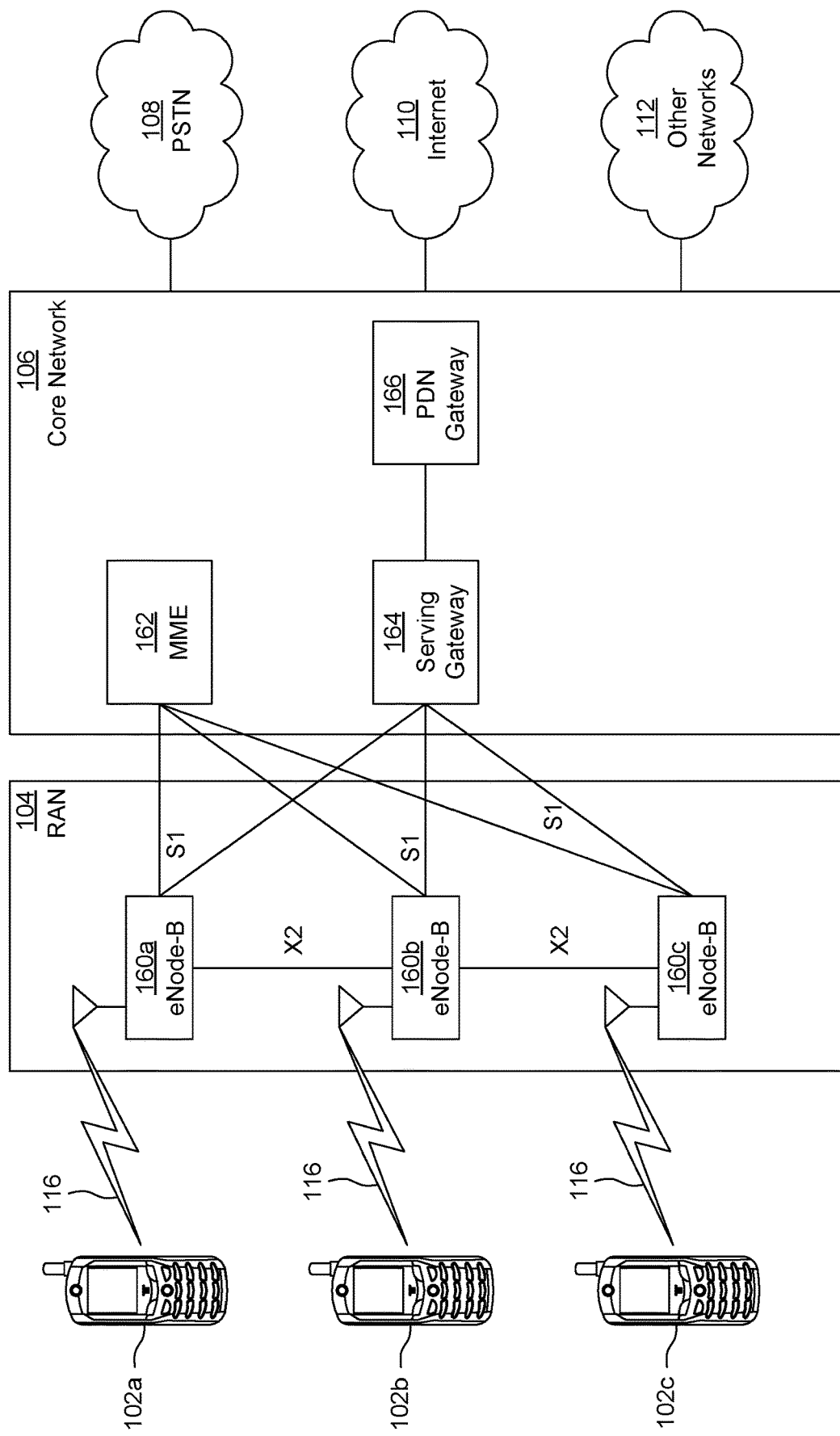
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum.

According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
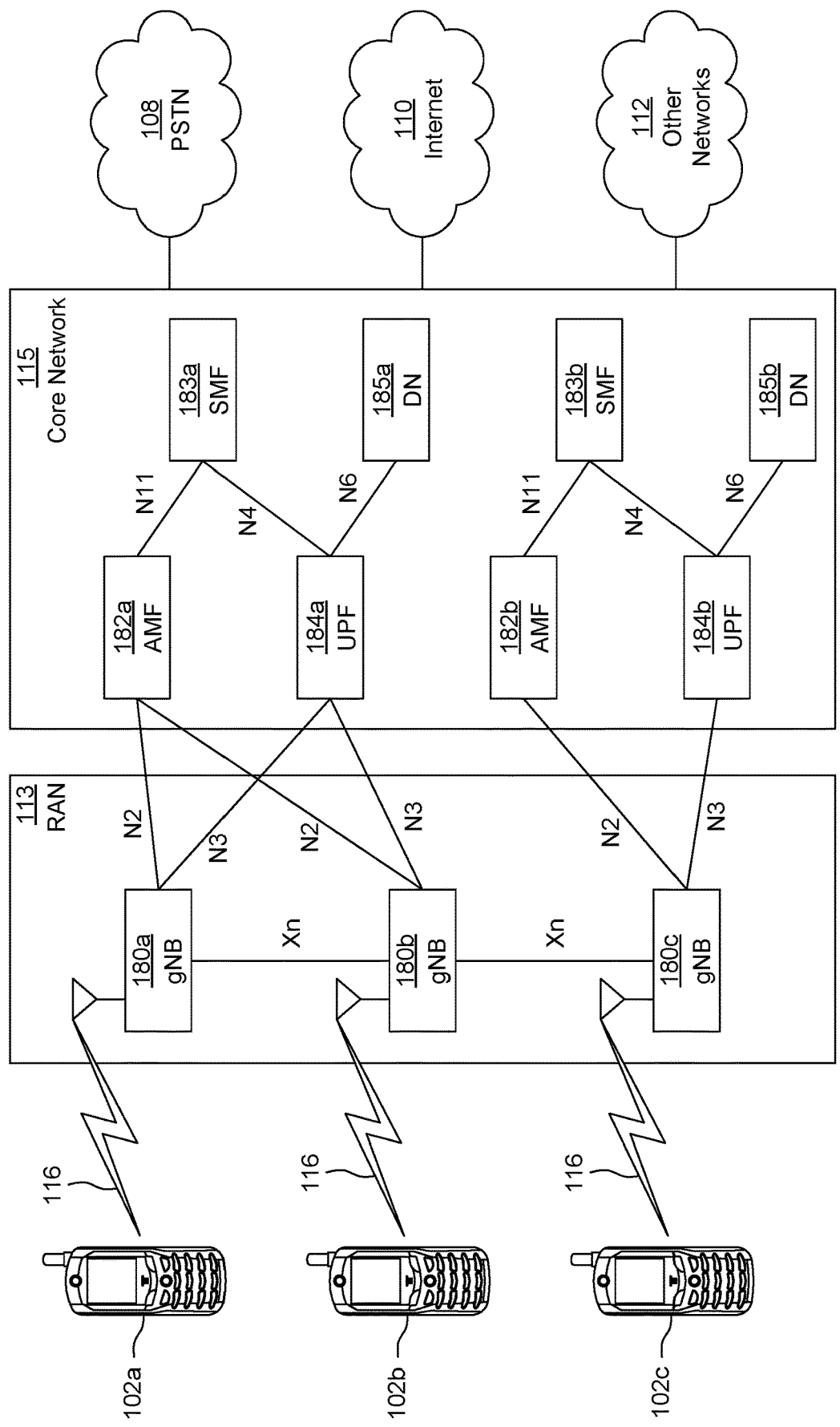
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Security Policy for User Plane/Uu Link, eV2X PC5 Link, and Network Relay

In a case wireless networking (e.g., according to 3GPP Rel-15), there may be user plane (UP) security policy associated with (e.g., applied to, for, etc.) UP traffic over a Uu interface (interchangeably referred to as a Uu link herein). In such a case, a session management function (SMF), for example, based on subscription information and network policy, may determine UP security (e.g., integrity, confidentiality) and may inform a NG-RAN node whether UP security is to be activated for a particular PDU session during PDU session establishment. Further, in such a case, a WTRU may be informed of the security policy during PDU session establishment, for example, by the NG-RAN node using a security activation indication during RRC signaling.

In a case wireless networking (e.g., according to 3GPP Rel-16), there may be a eV2X PC5 link security policy for UP traffic and control plane (CP) traffic. In such a case, a WTRU is provisioned with a PC5 link security policy (e.g., for any of a CP and a UP) on a per V2X service basis, for example, during a service authorization and provisioning procedure. In such a case, during PC5 link establishment, the peer WTRUs negotiate whether any of UP and CP security (e.g., integrity, confidentiality) are to be activated. Further, in such a case, an initiating WTRU provides its signaling (e.g., CP) security policy in Direct Communication Request (DCR) messages or similar PC5 Signaling Request (e.g., any similar and/or suitable signaling message/transmission/element, etc.) and its UP security policy in Direct Security Mode Complete (DSM Complete) messages. Then, a receiving WTRU determines whether to accept or reject the connection request, for example, based on its own CP and UP security policies being compatible with those of the initiating WTRU.

In a case wireless networking (e.g., according to 3GPP/SA2 Rel-17 ProSe study), there may be support for layer 2 (L2) and layer 3 (L3) WTRU-to-Network (WTRU2NW) relay. In such a case, a remote WTRU connects to a L3 WTRU2NW relay (e.g., using a PC5 link), which establishes a PDU Session and/or reuses/modifies an existing PDU Session (e.g., over the Uu link), for example, to provide network connectivity to the remote WTRU. Further there may be a case (e.g., see SA3 Rel-17 ProSe security) having Key Issues related to WTRU2NW relay communication security. In view of such a case, there has been discussion regarding addressing security risks associated with security protection inconsistencies between the PC5 and Uu links used for relayed communication. Further, in such a case, there are related proposals for the WTRU2NW relay to align the Uu security policy based on PC5 security policy negotiated over a PC5 link. In such a case, when a relay detects a misalignment between the PC5 and Uu security policies, the relay either establishes a new or modifies an existing PDU session, and provides the network with the required Uu security policy, for example, so that the network aligns the Uu security with the PC5 security established over the PC5 link. There are other related proposals for a case where a remote WTRU and WTRU2NW relay are provisioned with both PC5 and Uu security policies, wherein the WTRU2NW relay negotiates PC5 security policy with the remote WTRU, for example, based on both the WTRU2NW relay's PC5 and Uu security policies.

In wireless communications/networking (e.g., related art, as described above, etc.), the security establishment procedures of the PC5 and Uu links are performed independently of one another. In addition, their respective security policies are provided and enforced independently of one another as part of different procedures. Inconsistent security protection due to inconsistent and/or incompatible security policies, for example, when applied across the PC5 and Uu links, may lead to security vulnerabilities for relay communications. For example, data may be confidentiality protected over a PC5 link while being exposed to an attacker if confidentiality protection over the Uu link is not activated and/or vice-versa. Such example (e.g., issue) applies fora L3 WTRU2NW relay that establishes two security contexts, such as one for PC5 and one for Uu. According to embodiments, in view of the above, there is a need to address and provide methods, operations, entities, devices, systems, etc., for enabling consistent end-to-end (e2e) security across both a PC5 link and a Uu link for relayed communication using a L3 U2NW relay.

Relay Determination and/or Usage of E2E Security Policy During PC5 Link Setup

According to embodiments, during a PC5 link establishment, a relay WTRU, for example, a L3 WTRU2NW relay, may request (e.g., send a message/signal for requesting) a Uu security policy from the network, and may determine an e2e security policy, for example, based on Uu and PC5 UP security policies. According to embodiments, the relay WTRU may apply the e2e security policy, for example, when negotiating a PC5 link security policy with a remote WTRU. According to embodiments, there may be a case having (e.g., as a precondition, need, pre-configuration, pre-requisite, etc.) a remote WTRU and a relay WTRU that may be provisioned with a PC5 UP and/or CP security policy on a per ProSe service basis.

According to embodiments, a relay WTRU (e.g., a L3 WTRU2NW relay) may perform any of the following (e.g., first through eleventh) operations. According to embodiments, (e.g., as a first operation) a relay WTRU may receive a DCR message from a remote WTRU, for example, for any number of ProSe services, and the DCR message may include associated PC5 signaling security policy. For example, according to embodiments, a DCR message may include a maximum data rate, for example, for integrity protection, supported by a remote WTRU (e.g., as part of the remote WTRU security capabilities). According to embodiments, (e.g., as a second operation) a relay WTRU may authenticate a remote WTRU. According to embodiments, (e.g., as a third operation) a relay WTRU may (e.g., during and/or after authenticating a remote WTRU) determine that a new PDU session may be needed (e.g., is required) to satisfy session parameters (e.g., Type, S-NSSAI, DNN, SSC mode, etc.) associated with a remote WTRU.

According to embodiments, (e.g., as a fourth operation) a relay WTRU may send, for example, to a network, a policy request message to query UP security policy information for Uu (e.g., for a Uu interface/link). According to embodiments, a policy request message may include any number of (e.g., desired) PDU session parameters (e.g., Type, S-NS-SAI, DNN) to enable SMF selection. According to embodiments (e.g., as an alternative), a relay WTRU may send a PDU session establishment request with information indicating that the request for (e.g., to retrieve the) security policy is for relaying (e.g., is used for the purpose of relaying). According to embodiments, a SMF may not establish a user plane (a UP function/session, etc.), for example, in a case where the SMF receives such an indication (e.g., that the request is for relaying) in a PDU session request. According to embodiments, a relay WTRU may send information indicating (e.g., included in a policy and/or PDU session request message) a maximum data rate for integrity protection supported by any of the relay WTRU and the remote WTRU. In such a case, according to embodiments, a relay WTRU may include (e.g., in a request message) lowest maximum data rates for integrity protection supported between a remote WTRU and the relay WTRU. According to embodiments, an AMF may select and/or route a policy and/or PDU session request message to a (e.g., selected, proper, determined, certain, etc.) SMF, for example, according to PDU session parameters.

According to embodiments, a SMF may determine the UP security policy according to any of: subscribed and/or locally configured UP security policy, and relay maximum data rate parameter(s). According to embodiments, an SMF may send a response message, for example, including (e.g., information indicating) the (e.g., determined) UP security policy information for Uu (e.g., a Uu link/interface). For example, such a response message may include values for any of UP integrity and confidentiality protection (e.g., REQUIRED, PREFERRED, or NOT NEEDED). According to embodiments, a network (e.g., the SMF) may start a timer associated with (e.g., to/for expect/ing) the user plane establishment for this PDU session (e.g., see operation ten discussed below). According to embodiments, in a case of expiry of such a timer, wherein the network does not receive any request from the WTRU to establish a UP, the SMF may delete the PDU session context (e.g., there may be an implicit deactivation of a PDU session). According to embodiments, a relay WTRU may also perform implicit deactivation of a (e.g., such, this) PDU session, for example, in a case where the relay WTRU rejects a DCR from a remote WTRU, for example, after a sixth operation discussed below.

According to embodiments, (e.g., as a fifth operation) a relay WTRU may receive a response message, for example, including information indicating UP security policy information for Uu (e.g., Uu link, interface, operations, etc.). According to embodiments, (e.g., as a sixth operation) a relay WTRU may determine an end to end (e2e) UP security policy, for example, according to (e.g., using, based on, etc.) any of a received SMF UP security policy for Uu and a PC5 UP security provisioned on a relay WTRU for a (e.g., particular, requested, etc.) service (e.g., see first operation discussed above). According to embodiments, in a case of any of confidentiality and integrity being set to PREFERRED for Uu and REQUIRED for PC5 (e.g., or vice versa), then the end to end security policy may be set to REQUIRED. According to embodiments, in a case of any of confidentiality and integrity being set to the same value for Uu and PC5, then the end to end security policy may be set to the same (e.g., that) value.

According to embodiments, (e.g., as a seventh operation) a relay WTRU may send a Direct Security Mode Command message to remote WTRU. According to embodiments, (e.g., as a eighth operation) a relay WTRU may receive a Direct Security Mode Complete message from a remote WTRU, the message including the remote WTRU's UP security policy for PC5. According to embodiments, (e.g., as a ninth operation) a relay WTRU may check that (e.g., determine whether) an end to end security policy is compatible with any of: a remote WTRU's UP (e.g., as per the sixth operation discussed above) security policy for PC5, and the relay WTRU's explicit security policy for securing communications as a relay WTRU with the remote WTRU. According to embodiments, (e.g., as a tenth operation) a relay WTRU may perform (e.g., proceed with) a PDU session establishment procedure using PDU session parameters, for example, parameters as determined above. According to embodiments (e.g., as an alternative) a relay WTRU may send any of a service request message or a NAS message to activate the user plane for the PDU session, for example, in a case where a PDU session request is sent as discussed above regarding the fourth operation).

According to embodiments, (e.g., as an eleventh operation) a relay WTRU may send a DCA message or a PC5 Signaling accept message to a remote WTRU, for example, the DCA message including information indicating a selected UP security configuration (e.g., integrity and/or confidentiality ON or OFF), for example, according to the UP security policy received from the remote WTRU and an end-to-end UP security policy. According to embodiments, in a case of the end to end UP security policy having confidentiality protection set to PREFERRED, and the confidentiality protection for the remote WTRU policy is set to REQUIRED, then the selected UP confidentiality protection configuration may be set to ON. According to embodiments, in a case where the end to end policy has confidentiality protection set to REQUIRED, and the confidentiality protection for the remote WTRU policy is set to PREFERRED, then the selected UP confidentiality protection configuration may be set to ON. According to embodiments, such (e.g., similar) rules may be applied to select the UP integrity protection configuration according to the end to end security policy and the remote WTRU's UP security policy.

According to embodiments, there may be any of additional and alternative operations and/or scenarios for any of the above discussed operations and/or embodiments. For example, according to embodiments, a (e.g., alternative) fifth operation may be such that a relay WTRU may receive a response message that includes a failure code, for example, in a case where a SMF determines that it is not possible to enforce the security policy for the relay WTRU (e.g., a maximum data rate for integrity protection supported by the relay WTRU is lower than what is expected for the data network (DN)). In such a case, the relay WTRU may reject a DCR from the remote WTRU, and, for example, may send a reject message with information indicating a cause value associated with "cannot support requested security policy".

According to embodiments, a (e.g., alternative) sixth operation may be such that, in a case where PC5 and Uu security policies may not (e.g., cannot) be reconciled, for example, to determine an e2e security policy, a relay WTRU may reject a DCR. According to embodiments, the relay WTRU may reject a DCR in a case where any of confidentiality and integrity is set to NOT NEEDED for Uu and is set to REQUIRED for PC5, or vice versa). According to embodiments, a (e.g., another alternative) sixth operation may be such that, in a case where signaling confidentiality protection is not activated (e.g., based on a CP security policy from a first operation), then a relay WTRU may treat a UP confidentiality policy for the PC5 link as NOT NEEDED, and may (e.g., proceed with) determine the e2e security policy (e.g., as discussed above above).

According to embodiments, a (e.g., another alternative) sixth operation may be such that a remote WTRU checks that Uu and PC5 security are compatible. That is, according to embodiments, a relay WTRU may send any of the Uu Security policy or the e2e security policy to a remote WTRU, and the remote WTRU may checks that provided Uu and/or e2e security policy is compatible with the remote WTRU's own PC5 UP security policy. In such a case, the remote WTRU may (e.g., proceeds with) send a DSM Complete message providing its PC5 UP security policy, for example, to the relay WTRU, and the relay WTRU may check that the remote WTRU's PC5 UP security policy compatible with the relay WTRU's PC5 UP security policy. According to embodiments, an (e.g., alternative) ninth operation may be such that, in a case where an e2e UP security policy may not (e.g., cannot) be reconciled with a remote WTRU's UP security policy for the PC5 link, then a relay WTRU may reject a connection request.

Figure 2:
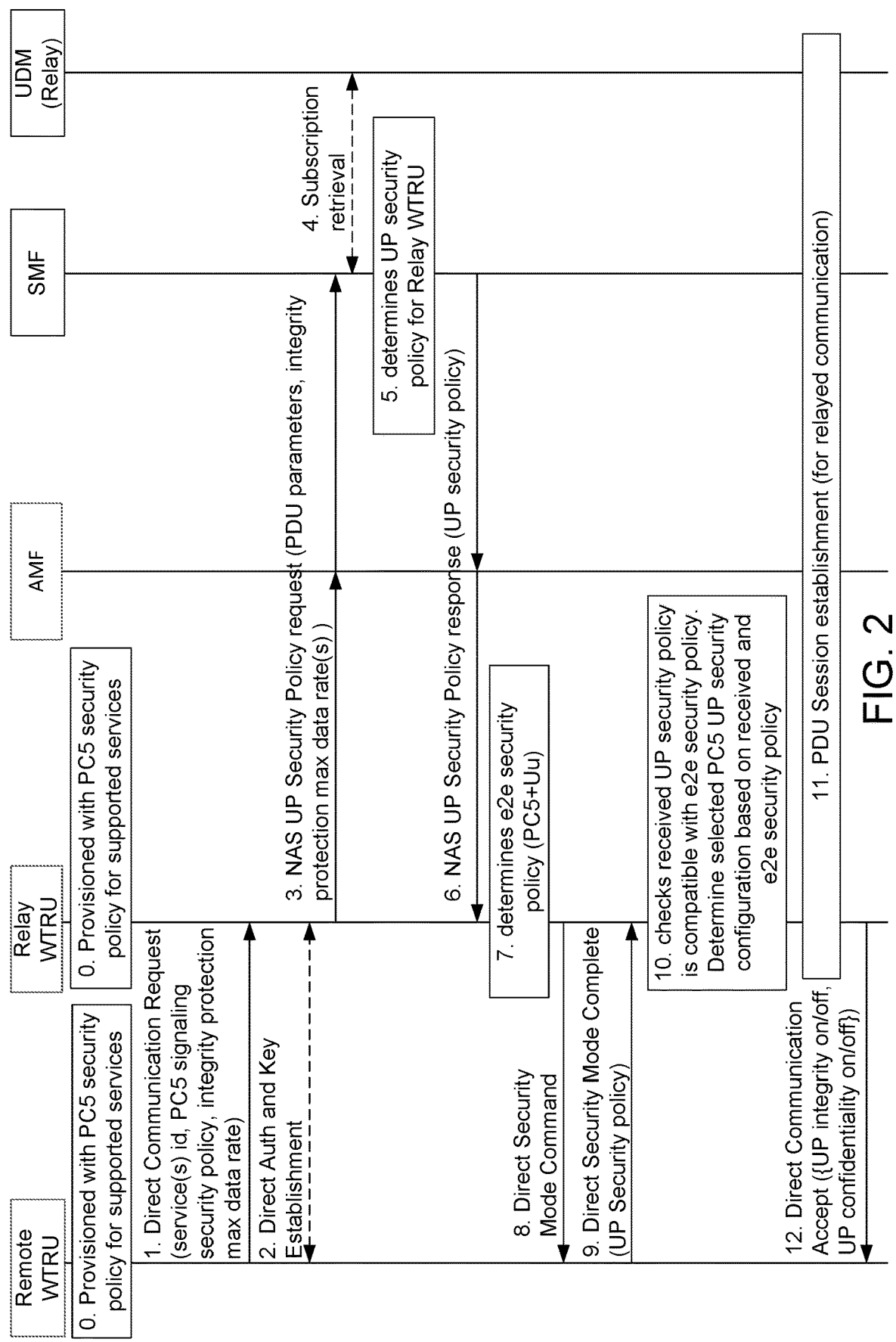
FIG. 2 is a diagram illustrating a procedure for an e2e security policy enforcement by a L3 WTRU2NW relay using a Uu security policy queried from a network, according to embodiments.

FIG. 2 is a diagram illustrating a procedure for an e2e security policy enforcement by a L3 WTRU2NW relay using a Uu security policy queried from a network, according to embodiments.

According to embodiments, for example, referring to FIG. 2, any of the following procedures, features, and/or operations (e.g., operations zero through twelve) may be performed. According to embodiments, (e.g., as operation zero) a remote WTRU and a relay WTRU may be provisioned and/or configured with a PC5 security policy, for example, for any number of (e.g., each, per) ProSe services. According to embodiments, (e.g., as operation one) a remote WTRU may send a DCR message to a relay WTRU, the message including any of a (e.g., requested) ProSe service(s) ID(s), a PC5 signaling security policy, and a maximum data rate for integrity protection that the remote WTRU may support.

According to embodiments, (e.g., as operation two) a relay WTRU may perform an (e.g., optional) authentication and key establishment procedure with a remote WTRU. According to embodiments, (e.g., as operation three) a relay WTRU may determines that a new PDU session may be needed (e.g., is required), for example, according to service ID provisioned information and/or from included parameters in a DCR, to satisfy a remote WTRU's connectivity requirements (e.g., S-NSSAI, DNN). According to embodiments, a relay WTRU may send a UP security policy query to an AMF, the query including any of: PDU session parameters and maximum data rate for integrity protection supported by the relay WTRU and/or the remote WTRU. According to embodiments, an AMF may select an (e.g., appropriate) SMF, for example, according to the provided PDU session parameters, and the AMF may forward the UP security policy request to the selected SMF.

According to embodiments, (e.g., as operation four) a (e.g., selected) SMF may retrieve, for example, from a Unified Data Management (UDM) (e.g., device, entity, apparatus, service, function, operation, etc.), subscription information for a relay WTRU. According to embodiments, (e.g., as operation five) a SMF may determine the UP security policy to be enforced for the relay WTRU, for example, according to (e.g., based on, using, etc.) any of subscription information (e.g., subscribed UP security policy), locally configured security policy (e.g., based on received S-NSSAI, DNN parameters), and maximum data rate for integrity protection supported by the relay WTRU and/or Remote WTRU. According to embodiments, (e.g., as operation six) a SMF may send a UP security policy response message to a relay WTRU via an AMF, the response message including the UP security policy that applies over Uu.

According to embodiments, (e.g., as operation seven) a relay WTRU may determine an end to end UP security policy using any of the provisioned PC5 UP security policy and the received Uu UP security policy (e.g., as discussed hereinabove). According to embodiments, (e.g., as operation eight) a relay WTRU may send a Direct Security Mode Command message to a remote WTRU to establish security of/for a PC5 link. According to embodiments, (e.g., as operation nine) a remote WTRU may perform (e.g., appropriate) security checks for a (e.g., over/using/on the) DSM Command message, and the remote WTRU may send (e.g., reply with) a Direct Security Mode Complete message including the remote WTRU's PC5 UP security policy.

According to embodiments, (e.g., as operation ten) a relay WTRU may determine whether (e.g., checks that) the received PC5 UP security policy is compatible with the (e.g., previously determined at operation seven) e2e security policy. For example, there may be a case having incompatible policies, wherein one policy has any of integrity/confidentiality set to NOT NEEDED and the other policy has any of integrity/confidentiality set to REQUIRED. In such a case, according to embodiments, such policies may be considered compatible otherwise. In such a case, a relay WTRU may determine the selected PC5 UP security configuration using the received PC5 UP security policy and the e2e security policy. For example, such determination of the selected security configuration may be performed as described above. According to embodiments, (e.g., as operation eleven) a relay WTRU may perform (e.g., proceeds with) a PDU Session establishment procedure to provide connectivity to a remote WTRU. According to embodiments, (e.g., as operation twelve) a relay WTRU may send a Direct Communication Accept message including a (e.g., selected, as discussed in operation ten) security configuration.

L3 WTRU2NW Relay Determination/Usage of E2E Security Policy During PC5 Link Setup Using PDU Session Associated Uu Security Policy According to embodiments, for example, during PC5 link establishment, a relay WTRU (e.g., a L3 WTRU2NW relay) may perform any of retrieve a (e.g., already established), or establish a (e.g., new), Uu UP security policy associated with a PDU session, for example, to be used for remote WTRU connectivity. That is, such a PDU session may be (e.g., already) established or the relay WTRU may establish a new PDU session. According to embodiments, a relay WTRU may determine an e2e security policy, for example, according to any of Uu and PC5 UP security policies. According to embodiments, a relay WTRU may use a (e.g., the determined) e2e security policy in a case of negotiating a PC5 link security policy with a remote WTRU. According to embodiments, there may be a case having (e.g., as a precondition, need, pre-configuration, pre-requisite, etc.) a remote WTRU and a relay WTRU that are provisioned with a PC5 UP/CP security policy per ProSe service basis.

According to embodiments, a relay WTRU (e.g., a L3 WTRU2NW relay) may perform any of the following (e.g., first through ninth) operations. According to embodiments, (e.g., as a first operation) a relay WTRU may receive a DCR message from a remote WTRU for a particular service, the message including information indicating a PC5 signaling security policy. For example, the DCR message may include information indicating a maximum data rate for integrity protection supported by the remote WTRU (e.g., as part of the remote WTRU security capabilities). According to embodiments, (e.g., as a second operation) a relay WTRU may authenticate the remote WTRU. According to embodiments, (e.g., as a third operation) a relay WTRU may determine that an existing PDU Session satisfies (e.g., meets, matches, is compatible with, etc.) a remote WTRU's PDU Session parameters (e.g., type, S-NSSAI, DNN, SSC mode). According to embodiments, (e.g., as an alternative), a relay WTRU may establish a new PDU session with the desired parameters, for example, in a case where no existing PDU session may satisfy the remote WTRU's connectivity requirements (e.g., PDU session requirements). In such a case, the relay WTRU may include, in the policy/PDU session request message, information indicating a maximum data rate for integrity protection supported by any of the relay WTRU or the remote WTRU. For example, the relay WTRU may include information a lowest maximum data rate for integrity protection supported between the remote WTRU and the relay WTRU.

According to embodiments, (e.g., as a fourth operation) a relay WTRU may retrieve security activation information associated with the PDU Session. According to embodiments, security activation information may include information indicating values for UP integrity and confidentiality protection (e.g., REQUIRED, PREFERRED or NOT NEEDED). According to embodiments, (e.g., as a fifth operation) a relay WTRU may determine an end to end UP security policy using any of: (1) the received UP security policy associated with the PDU session, and (2) the UP security for PC5 provisioned on the relay WTRU for the service requested, for example, in the first operation discussed above. According to embodiments, in a case where any of confidentiality or integrity is set to PREFERRED for Uu and REQUIRED for PC5 (or vice versa), then the end to end security policy may be set to REQUIRED. According to embodiments, in a case where any of confidentiality and integrity is set to the same value for Uu and PC5, then the end to end security policy may be set to the same value. According to embodiments, (e.g., as a sixth operation) a relay WTRU may send a Direct Security Mode Command message to a remote WTRU.

According to embodiments, (e.g., as a seventh operation) a relay WTRU may receive a Direct Security Mode Complete message from a remote WTRU, the message including information indicating the remote WTRU's UP security policy for PC5. According to embodiments, (e.g., as a eighth operation) a relay WTRU may determine whether (e.g., check that) the end to end security policy is compatible with any of: (1) a remote WTRU's UP security policy for PC5, or (2) the relay WTRU's explicit security policy for securing communications as a relay WTRU with the remote WTRU. According to embodiments, (e.g., as a ninth operation) a relay WTRU may sends a DCA message to a remote WTRU, the DCA message including a selected UP security configuration (e.g., as described above).

Figure 3:
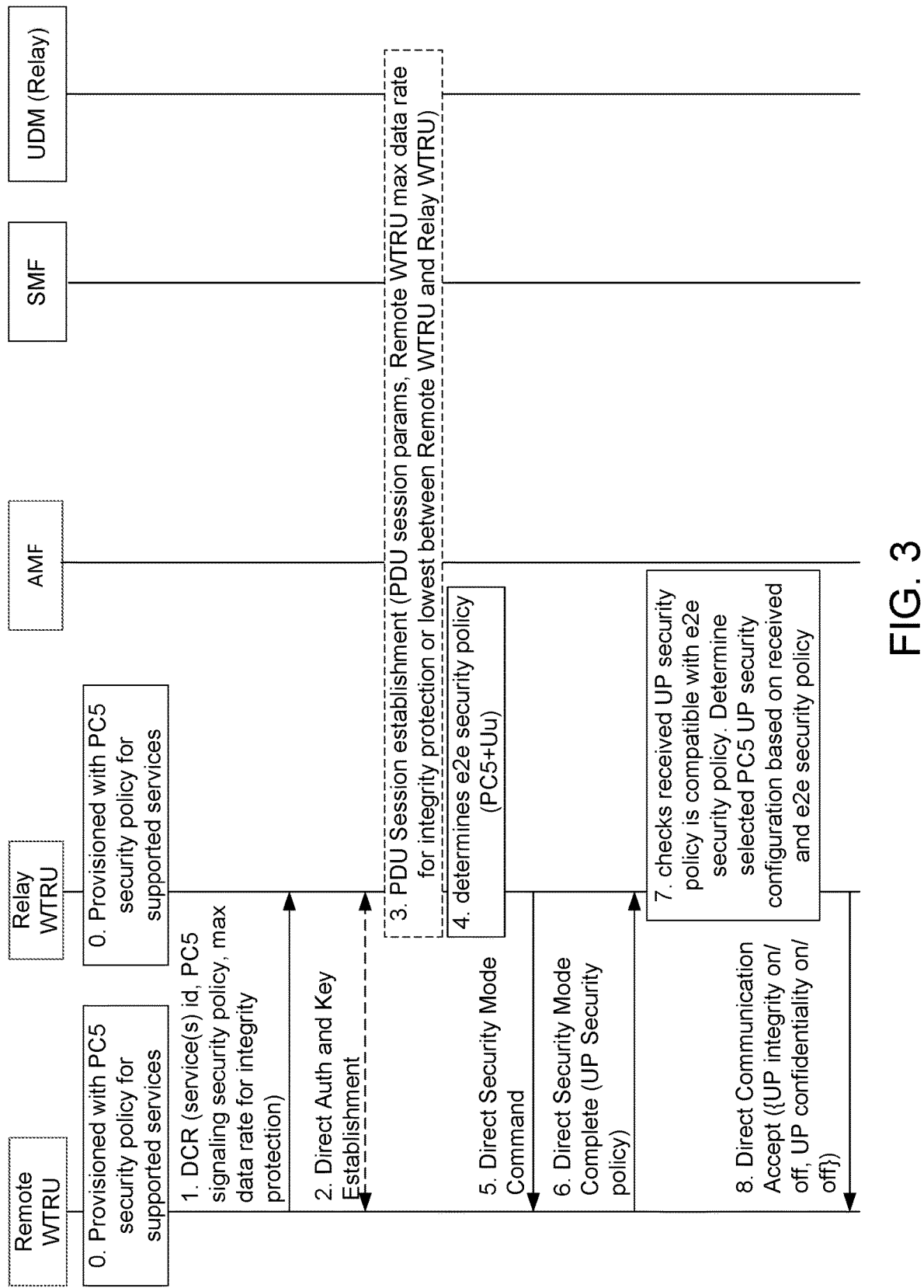
FIG. 3 is a diagram illustrating a procedure for an e2e security policy enforcement by a L3 WTRU2NW relay using a Uu security policy from an established PDU session, according to embodiments.

FIG. 3 is a diagram illustrating a procedure for an e2e security policy enforcement by a L3 WTRU2NW relay using a Uu security policy from an established PDU session, according to embodiments.

According to embodiments, for example, referring to FIG. 3, any of the following procedures, features, and/or operations (e.g., operations zero through eight) may be performed. According to embodiments, (e.g., as operation zero) a remote WTRU and a relay WTRU may be provisioned or configured with PC5 security policy for each ProSe service. According to embodiments, (e.g., as operation one) a remote WTRU may send a DCR message to a relay WTRU, the DCR message including information indicating a (e.g., requested) ProSe service(s) ID(s), and the PC5 signaling security policy. According to embodiments, (e.g., as operation two) a relay WTRU may perform (e.g., an optional) authentication and key establishment procedure with the remote WTRU. According to embodiments, (e.g., as operation three) the relay WTRU may determine, for example, according to any of service ID provisioned information and included parameters in the DCR message, whether a new PDU session is needed (e.g., required) to satisfy a remote WTRU's connectivity requirements (e.g., S-NSSAI, DNN). In a case where a new PDU session is needed, the relay WTRU may perform a PDU Session establishment procedure. According to embodiments, a relay WTRU may send, for example, in the PDU session establishment request, information indicating a maximum data rate for integrity protection supported by any of the relay WTRU and the remote WTRU.

According to embodiments, (e.g., as operation four) a relay WTRU may retrieve a Uu UP security policy from a PDU session that is found (e.g., determined) and/or established as discussed in above operations. According to embodiments, the relay WTRU may determine an end to end UP security policy according to a Uu UP security policy and a provisioned PC5 UP security policy, for example, as discussed above. According to embodiments, (e.g., as operation five) a relay WTRU may send a Direct Security Mode Command message to a remote WTRU, for example, to establish security of a PC5 link. According to embodiments, (e.g., as operation six) a remote WTRU may perform (e.g., appropriate) security checks for (e.g., on, over, across, etc.) the DSM Command message, and the remote WTRU may send (e.g., reply with) a Direct Security Mode Complete message including information indicating the remote WTRU's PC5 UP security policy. According to embodiments, (e.g., as operation seven) a relay WTRU may determine whether (e.g., checks that) the received PC5 UP security policy is compatible with the determined e2e security policy (e.g., see operation 4 above). According to embodiments, a relay WTRU may determine (e.g., select, for example, as discussed above) a PC5 UP security configuration, for example, according to (e.g., using, based on, etc.) a received PC5 UP security policy and the e2e security policy. According to embodiments, (e.g., as operation eight) a relay WTRU may send a Direct Communication Accept message including a determined/selected PC5 UP security configuration.

According to embodiments, (e.g., as an alternative to operations discussed above with respect FIG. 3), in a case where a relay WTRU establishes a PDU session, the relay WTRU may send a relay indication (e.g., information indicating relaying), for example, in the PDU session request, to the SMF. According to embodiments, the SMF (e.g., as a result of receiving the relay indication) may send any of: (1) the Uu security policy to the relay WTRU via NG-RAN (e.g., received by the relay WTRU from a network/gNB, according to the security indication in the RRC message), and (2) another PC5 specific security policy for relaying purpose (e.g., a policy associated with/for relaying included in a PDU session establishment accept message). According to embodiments, integrity and/or confidentiality may be any of on or off in a case where a relay WTRU is transmitting traffic received on the PC5 interface. According to embodiments, a SMF may determine the PC5 specific security policy according to inputs and interaction from any of the PCF and the ProSe Application Server.

According to embodiments, a PCF may receive inputs from a ProSe application server, and may (e.g., use such inputs to) determine parameters for the PC5 security policy, and the PCF may (e.g., then) send such determined parameters/policies to the SMF. According to embodiments, a relay WTRU may use PC5 security policy received in the PDU session accept message to determine whether to accept a Direct Link request from a remote WTRU, for example, by overriding any provisioned PC5 UP security policy with the PC5 security policy received from SMF. According to embodiments, a relay indication may be sent in any of: (1) a case where a relay WTRU decides to use an existing PDU (e.g., it is assumed that the relay WTRU sent the indication when establishing the PDU session), or (2) a case where a relay WTRU decides to establish a new PDU to relay the traffic from a remote WTRU. According to embodiments, in any of such cases, the relay WTRU may associate the indication and/or received PC5 security policy specific for relaying purposes to the PDU session, may receive the security policy (e.g., Uu and/or PC5) from the network or retrieve it from an existing PDU session, and the relay WTRU may use the security policy to determine whether to accept the PC5 connection request (DCR) from the remote WTRU.

L3 WTRU2NW Relay PCF Based Provisioning With E2E Security Policy/Usage During PC5 Link Setup According to embodiments, a relay WTRU may use a PCF based provisioning procedure for any of requesting an e2e security policy and requesting a Uu security policy. For example, according to embodiments, such any (e.g., both) of such requests may be made using (e.g., be included in a) UE Policy Container during a registration procedure. According to embodiments, a relay WTRU may use an e2e security policy when negotiating a PC5 link security policy with a remote WTRU, for example, during a PC5 link establishment as discussed above.

According to embodiments, a L3 WTRU2NW relay, that is, a relay WTRU, may perform any of the following operations (e.g., feature, procedures, behaviors, methods, steps, etc.). According to embodiments, a relay WTRU may send a registration request including information indicating any of: ProSe WTRU2NW relay capabilities, a WTRU Policy Container indicating a request for provisioning, and a maximum data rate for integrity protection supported by the relay WTRU. According to embodiments, an AMF may select a PCF and may provide the PCF with information indicating the ProSe WTRU2NW relay capabilities. According to embodiments, the PCF may determine an e2e security policy according to the PC5 security policy associated with a (e.g., ProSe) service, and according to a Uu UP security policy associated with the relay WTRU subscribed UP security policy and the maximum data rate for integrity protection supported by the relay WTRU. According to embodiments, a relay WTRU may receive per service provisioning information including any of: service id, S-NSSAI, DNN, PC5 Security policy, and e2e UP security policy (e.g., registration accept message, for example, during a UE (e.g., WTRU) Configuration Update (UCU) for a WTRU policy delivery procedure). According to embodiments, in a case where a relay WTRU receives a Uu security policy, for example, instead of an e2e security policy, (e.g., then) the relay WTRU determines the e2e security policy according to any of the PC5 security policy and the Uu security policy, for example, as discussed above.

According to embodiments, (e.g., as an alternative to operations discussed above), a relay WTRU may use a WTRU triggered policy provisioning procedure, for example, to obtain any of a e2e security policy or a Uu security policy. According to embodiments, a relay WTRU may send a WTRU policy provisioning request, including any of: (1) a WTRU Policy Container indicating a request for any of an e2e security policy or a Uu security policy provisioning, and (2) a maximum data rate for integrity protection supported by the relay WTRU. According to embodiments, such relay WTRU may receive such (e.g., requested) provisioning information including per service e2e UP security policy, for example, as discussed above.

According to embodiments, a remote WTRU may be provisioned with a PC5 security policy and a separate e2e UP security policy, for example, as discussed above. Such an e2e UP security policy may be used in complement or instead of the provisioned PC5 UP security policy, for example, in a case of ProSe relay communication. According to embodiments, during PC5 link establishment with a L3 WTRU2NW relay (e.g., as discussed above), a remote WTRU may send its PC5 signaling security policy in a DCR message and may send its e2e UP security policy in a DSM Command message.

According to embodiments, an e2e UP security policy may need (e.g., require, be associated with, call for, etc.) different levels of security protection than the PC5 security policy that is used in a case where a relay WTRU is performing (e.g., non-relayed) D2D communication according to use cases/services different than those having relay communications/services. For example, in such a case, the UP integrity protection may be set to REQUIRED in the PC5 UP security policy, whereas the e2e UP security policy may have the UP integrity protection set to PREFERRED. According to embodiments, in such a case, such may be used to accommodate for connectivity with various relays with different capabilities (e.g., different maximum data rate for integrity protection) and/or may be used for providing connectivity enforcing different Uu UP security protection.

According to embodiments, a WTRU may perform any of actions, procedures, operations, etc., included in a method of the WTRU. For example, the WTRU may perform a method including any of the following operations. According to embodiments, as a first operation, a WTRU may receive (e.g., from another/remote WTRU) a message (e.g., a signal, a transmission, data, etc.) including information indicating any of a first security policy associated with a first data link used for communicating with the remote WTRU, and a maximum data rate for integrity protection (MDRIP) supported by the remote WTRU. According to embodiments, as a second operation, a WTRU may transmit (e.g., to a network, base station, gNB, eNB, etc.), a message for requesting a PDU session establishment, the message including information indicating the MDRIP supported by the remote WTRU and/or a MDRIP supported by the relay WTRU. According to embodiments, the request for establishment of a PDU session may be for relaying traffic associated with the Remote WTRU.

According to embodiments, as a third operation, a WTRU may receive (e.g., from the network) a message indicating a second security policy for a second data link (e.g., over Uu, via a Uu interface, etc.) used for relaying traffic associated with the remote WTRU, wherein the traffic associated with the WTRU may be going to or from the network. According to embodiments, as a fourth operation, a WTRU may establish the first data link with the remote WTRU, for example, in a case where an e2e security policy for relaying traffic between the network and the remote WTRU is compatible with the second security policy. According to embodiments, an e2e security policy may be determined by a relay WTRU, for example, according to the second security policy and a provisioned user plane (UP) security policy of the relay WTRU. That is, according to embodiments, an e2e security policy may be considered as (e.g., to be, etc.) a Uu security policy and (e.g., in combination with, in addition to, as compared with, in conjunction with, etc.) a PC5 UP security policy at the relay WTRU. In such case, for example, a relay WTRU may use an e2e security policy against a remote WTRU's PC5 UP security policy for negotiation.

According to embodiments, as another operation, a WTRU may perform (e.g., execute, initiate, etc.) an authentication and key establishment procedure with a remote WTRU. According to embodiments, as another operation, the remote WTRU may retrieve security policies associated with the established PDU session, and the WTRU may determine the e2e security policy for relaying traffic associated with the remote WTRU, for example, on condition that the relay WTRU determines that a new PDU session is not required. According to embodiments, as another operation, a WTRU may establish a PC5 data link with the remote WTRU. According to embodiments, a UP security policy may be received by the relay WTRU while establishing a PC5 data link with the remote WTRU.

According to embodiments, as another operation, a WTRU may the first message may be any of a Direct Communication Request (DCR) message and a PC5 request message. According to embodiments, in a case of establishing the first data link with the remote WTRU, a WTRU may transmit, to the remote WTRU, any of a Direct Communication Accept (DCA) message and a PC5 accept message. According to embodiments, an e2e policy may be determined according to any of: (i) a Uu security policy, and (ii) any of a provisioned PC5 security policy or PC5 security policy included in a UP security response message received from the network. According to embodiments, in a case of establishing the first data link with a remote WTRU, a WTRU may transmit a Direct Security Mode Command message to the remote WTRU to establish security of the PC5 link. According to embodiments, in such case, the WTRU may receive, from the remote WTRU, a Direct Security Mode Complete message including information indicating a PC5 UP security policy associated with the remote WTRU.

According to embodiments, an MDRIP, for example, that is indicated by the information included in the second message, may be/have a lowest data rate, for example, from among MDRIPs supported by the relay WTRU and the remote WTRU. According to embodiments, as another operation, a WTRU may determine whether a new PDU session may be needed (e.g., is required, is needed for satisfying) for connectivity requirements associated with the remote WTRU. According to embodiments, as another operation, a WTRU may determine that a remote WTRU UP security policy is compatible with the e2e security policy according to policy information associated with any of integrity protection settings or confidentiality protection settings. According to embodiments, a WTRU may determine a selected PC5 UP security configuration using (e.g., based on, according to, etc.) any of the remote WTRU UP security policy and the e2e security policy.

According to embodiments, any of a remote WTRU and a relay WTRU may be provisioned and/or configured with a PC5 security policy, for example, for each proximity services (ProSe) service associated with any of the relay WTRU or the remote WTRU. According to embodiments, as another operation, a WTRU may determine an e2e UP security policy using any of a provisioned PC5 UP security policy and the second security policy (e.g., associated with a data link over Uu). According to embodiments, the second message may include information indicating any of PDU session parameters, a relaying indication, and a MDRIP.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments (e.g., only) and is not intended to be limiting. As used herein, when referred to herein, the terms "user equipment" and its abbreviation "UE" may mean (1) a wireless transmit and/or receive unit (WTRU), such as described infra; (2) any of a number of embodiments of a WTRU, such as described infra; (3) a wireless-capable and/or wired-capable (e.g., tetherable) device configured with, inter alia, some or all structures and functionality of a WTRU, such as described infra; (4) a wireless-capable and/or wired-capable device configured with less than all structures and functionality of a WTRU, such as described infra; or (5) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method performed by a relay wireless transmit/receive unit (WTRU), the method comprising:
   receiving, from a remote WTRU, a first message comprising first information, the first information indicating a first security policy associated with a first data link used for communicating with the remote WTRU and a maximum data rate for integrity protection (MDRIP) supported by the remote WTRU;
   transmitting, to a network, a second message comprising second information, the second information indicating the MDRIP supported by the relay WTRU and a request for establishment of a packet data unit (PDU) session for relaying traffic associated with the remote WTRU;
   receiving, from the network, a third message comprising third information, the third information indicating a second security policy associated with a second data link used for relaying traffic associated with the remote WTRU to or from the network;
   determining an end-to-end (e2e) security policy for relaying traffic between the network and the remote WTRU based on the first security policy associated with the first data link and the second security policy associated with the second data link;
   establishing the first data link with the remote WTRU based on the e2e security policy for relaying traffic between the network and the remote WTRU being compatible with the second security policy; and
   performing a PDU session establishment procedure to provide connectivity to the remote WTRU based on the e2e security policy and the MDRIP supported by the remote WTRU or supported by the relay WTRU.

2. The method of claim 1, further comprising, prior to performing the PDU session establishment procedure:
   sending a direct security mode command message to the remote WTRU to establish security of the first data link;
   receiving a user plane (UP) security policy for the first data link from the remote WTRU; and
   comparing the UP security policy with the e2e security policy.

3. The method of claim 2, further comprising sending a direct communication accept message based on the UP security policy.

4. The method of claim 2, wherein the PDU session establishment procedure is based on the UP security policy.

5. The method of claim 1, wherein the first data link is a PC5 link and the second data link is a Uu link.

6. The method of claim 1, further comprising performing an authentication and key establishment procedure with the remote WTRU.

7. The method of claim 1, wherein the second message and the third message are associated with a non-access stratum (NAS) user plane (UP).

8. The method of claim 1, further comprising determining whether a new PDU session is required to satisfy connectivity requirements associated with the remote WTRU.

9. The method of claim 1, wherein the MDRIP indicated in the first information and the second information is a lowest MDRIP supported by either the relay WTRU or the remote WTRU.

10. A relay wireless transmit/receive unit (WTRU) comprising:
   a receiver configured to:
      receive, from a remote WTRU, a first message comprising first information, the first information indicating a first security policy associated with a first data link used for communicating with the remote WTRU and a maximum data rate for integrity protection (MDRIP) supported by the remote WTRU;

a transmitter configured to:
  transmit, to a network, a second message comprising second information, the second information indicating the MDRIP supported by the relay WTRU and a request for establishment of a packet data unit (PDU) session for relaying traffic associated with the remote WTRU, wherein the receiver is configured to receive, from the network,
a third message comprising third information, the third information indicating a second security policy associated with a second data link used for relaying traffic associated with the remote WTRU to or from the network; and
a processor configured to:
  determine an end-to-end (e2e) security policy for relaying traffic between the network and the remote WTRU based on the first security policy associated with the first data link and the second security policy associated with the second data link;
  establish the first data link with the remote WTRU based on the e2e security policy for relaying traffic between the network and the remote WTRU being compatible with the second security policy; and
  perform a PDU session establishment procedure to provide connectivity to the remote WTRU based on the e2e security policy and the MDRIP supported by the remote WTRU or supported by the relay WTRU.

11. The WTRU of claim 10, wherein the transmitter is configured to send a direct security mode command message to the remote WTRU to establish security of the first data link, the receiver is configured to receive a user plane (UP) security policy for the first data link from the remote WTRU, and the processor is configured to compare the UP security policy with the e2e security policy, prior to performing the PDU session establishment procedure.

12. The WTRU of claim 11, wherein the transmitter is further configured to send a direct communication accept message based on the UP security policy.

13. The WTRU of claim 11, wherein the PDU session establishment procedure is based on the UP security policy.

14. The WTRU of claim 10, wherein the first data link is a PC5 link and the second data link is a Uu link.

15. The WTRU of claim 10, wherein the processor is further configured to perform an authentication and key establishment procedure with the remote WTRU.

16. The WTRU of claim 10, wherein the second message and the third message are associated with a non-access stratum (NAS) user plane (UP).

17. The WTRU of claim 10, wherein the processor is further configured to determine whether a new PDU session is required to satisfy connectivity requirements associated with the remote WTRU.

18. The WTRU of claim 10, wherein the MDRIP indicated in the first information and the second information is a lowest MDRIP supported by either the relay WTRU or the remote WTRU.

* * * * *